United States Patent
Yamabana

(10) Patent No.: US 11,852,948 B2
(45) Date of Patent: Dec. 26, 2023

(54) OPTICAL TRANSMITTER, OPTICAL TRANSCEIVER, AND METHOD OF CONTROLLING BIAS VOLTAGE OF ELECTRO-OPTIC MODULATOR

(71) Applicant: Fujitsu Optical Components Limited, Kawasaki (JP)

(72) Inventor: Tetsuji Yamabana, Kawasaki (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 42 days.

(21) Appl. No.: 17/742,812

(22) Filed: May 12, 2022

(65) Prior Publication Data

US 2022/0404678 A1 Dec. 22, 2022

(30) Foreign Application Priority Data

Jun. 16, 2021 (JP) ................................. 2021-100258

(51) Int. Cl.
*G02F 1/21* (2006.01)
*G02F 1/225* (2006.01)
*G02B 6/293* (2006.01)
*G02F 1/025* (2006.01)

(52) U.S. Cl.
CPC ........... *G02F 1/212* (2021.01); *G02B 6/2935* (2013.01); *G02F 1/025* (2013.01); *G02F 1/225* (2013.01)

(58) Field of Classification Search
None
See application file for complete search history.

(56) References Cited

U.S. PATENT DOCUMENTS

| | | | |
|---|---|---|---|
| 9,104,084 B2 * | 8/2015 | Tipper | H04B 10/50575 |
| 9,494,810 B2 | 11/2016 | Bhandare et al. | |
| 10,082,718 B2 * | 9/2018 | Schmogrow | G02F 1/0123 |
| 10,509,243 B2 * | 12/2019 | Rohde | G02F 1/225 |
| 2012/0288284 A1 * | 11/2012 | Yoshida | H04B 10/50595 |
| | | | 398/186 |
| 2016/0282638 A1 | 9/2016 | Bhandare et al. | |
| 2018/0088359 A1 | 3/2018 | Shirakawa | |
| 2022/0404678 A1 * | 12/2022 | Yamabana | G02F 1/225 |

FOREIGN PATENT DOCUMENTS

| | | |
|---|---|---|
| JP | 2018-054907 A | 4/2018 |
| JP | 2018-515803 A | 6/2018 |
| JP | 6805687 A | 12/2020 |

* cited by examiner

*Primary Examiner* — Rhonda S Peace
(74) *Attorney, Agent, or Firm* — STAAS & HALSEY LLP

(57) ABSTRACT

In an optical transmitter having an electro-optic modulator with first child MZI and a second child MZI nested to form a parent MZI, and a processor that controls the bias voltages of electro-optic modulator. In the first section of a control loop, the processor simultaneously superimposes different dither signals onto the first bias voltage of the first child MZI and the second bias voltage of the second child MZI, and extracts the first phase error information for the first child MZI and the first-round third phase error for the parent MZI from a first monitoring result. In the second section of the control loop, the processor simultaneously superimposes different dither signals onto the first and second bias voltages, and extracts the second phase error information for the second child MZI and the second-round third phase error for the parent MZI from a second monitoring result.

16 Claims, 8 Drawing Sheets

$$P_{out} \propto \cos^2 \varphi_I + \cos^2 \varphi_Q - 2\cos 2\varphi_P \cdot \cos \varphi_I \cdot \cos \varphi_Q \quad \cdots (1)$$

$$P_{out} \propto \sin^2 \varphi_I' + \sin^2 \varphi_Q' + 2\sin 2\varphi_P' \cdot \sin \varphi_I' \cdot \sin \varphi_Q' \quad \cdots (2)$$

$$P_{out} \propto \cos^2 \varphi_I + \cos^2 \varphi_Q - 2\cos 2\varphi_P \cdot \cos \varphi_I \cdot \cos \varphi_Q \quad \cdots (1)$$

$$P_{out} \propto \sin^2 \varphi'_I + \sin^2 \varphi'_Q + 2\sin 2\varphi'_P \cdot \sin \varphi'_I \cdot \sin \varphi'_Q \quad \cdots (2)$$

OPTICAL TRANSMITTER, OPTICAL TRANSCEIVER, AND METHOD OF CONTROLLING BIAS VOLTAGE OF ELECTRO-OPTIC MODULATOR

CROSS-REFERENCE TO RELATED APPLICATIONS

This application is based upon and claims priority to earlier Japanese Patent Application No. 2021-100258 filed Jun. 16, 2021, which is incorporated herein by reference in its entirety.

FIELD

The present documents relate to an optical transmitter, an optical transceiver, and a method of controlling a bias voltage of an electro-optic modulator.

BACKGROUND

Optical coherent transceivers that perform quadrature phase-shift keying (QPSK) using Mach-Zehnder electro-optic Modulators (MZMs) are employed in fiber optic communications. An MZM adapted to perform QPSK has two MZMs called child MZMs which are nested to form one MZM called a parent MZM. In order to correctly perform phase modulation, it is a prerequisite for the electro-optic modulator to bring the respective child MZMs and the parent MZM to be in the appropriate phase states. Each of the MZMs is controlled into the appropriate phase by a bias voltage, but the bias voltage fluctuates due to deterioration over time, temperature changes, or other instable factors. Therefore, the bias voltage is controlled to the optimum point, simultaneously with signal modulation, even in actual service.

In typical auto bias control (ABC), a finely oscillated control voltage is applied in order to extract a response from the optical output of the electro-optic modulator and to feed back the response result to the bias voltage. A method of simultaneously dithering direct current (DC) bias voltages for the in-phase MZM, the quadrature-phase MZM, and the parent MZM using three different dither patterns is known. See, for example, Patent Document 1 presented below. In this document, interference terms between three dither patterns are detected to solve a set of three 1.0 simultaneous linear partial differential equations with three unknowns, and this operation is repeated until the iterations converge to a unique solution.

A technique of bias control on a parent MZM is proposed, in which a low frequency signal is superimposed onto the DC bias for the first modulator, while a positive DC offset is added to the DC bias for the second modulator during the first monitoring period, and a negative DC offset is added to the DC bias for the second modulator during the second monitoring period. See, for example, Patent Document 2 presented below. With this technique, the DC bias applied to the phase shifter of the parent MZM is controlled based on the error between the low frequency components detected during the first monitoring period and the second monitoring period.

ABC control requires insensitivity to noise and stability in convergence to the target level. Because these requirements are contradictory to each other, the issue is how to satisfy both of the requirements.

Related art documents described above are
Patent Document 1: Japanese Translation Publication No. 2018-515803 of PCT International Application; and
Patent Document 2: JP Patent No. 6805687.

SUMMARY

One aspect of the present disclosure is to provide a bias control technique for an electro-optic modulator, which satisfies both noise-tolerance and stability in convergence to a target bias.

In an embodiment, an optical transmitter has an electro-optic modulator in which a first child Mach-Zehnder interferometer and a second child Mach-Zehnder interferometer are nested to form a parent Mach-Zehnder interferometer, and
a processor that controls the first bias voltage for the first child Mach-Zehnder interferometer, the second bias voltage for the second child Mach-Zehnder interferometer, and the third bias voltage for the parent Mach-Zehnder interferometer based on the monitoring result of the output light of the electro-optic modulator. The processor simultaneously superimposes different dither signals onto the first bias voltage and the second bias voltage in the first section of a control loop, and extracts first phase error information of the first child Mach-Zehnder interferometer and first-round third phase error information of the parent Mach-Zehnder interferometer, from the monitoring result. In the second section of the control loop, the processor simultaneously superimposes different dither signals onto the first bias voltage and the second bias voltage, and extracts second phase error information of the second child Mach-Zehnder interferometer and second-round third phase error information of the parent Mach-Zehnder interferometer from the monitoring result.

The object and advantages of the invention will be realized and attained by means of the elements and combinations particularly pointed out in the claims. It is to be understood that both the foregoing general description and the following detailed description are exemplary and explanatory and are not restrictive to the invention as claimed.

EMBODIMENT(S)

Figure 1:
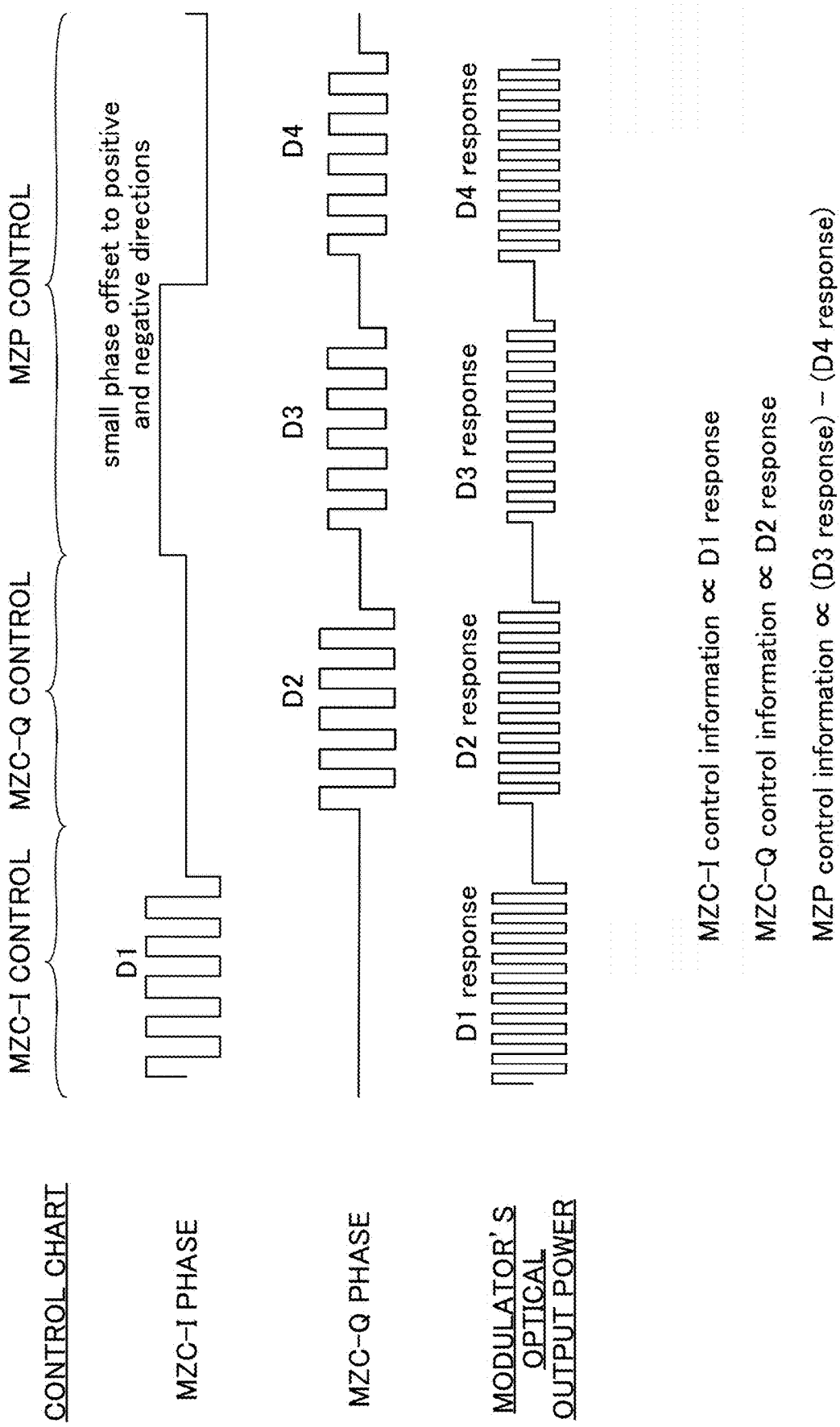
FIG. 1 is a diagram illustrating a technical problem arising in the conventional auto bias control.

Prior to describing bias control of the embodiments, technical problems arising in the conventional auto bias control method are described in more detail with reference to FIG. 1, which is a diagram reconstructing a known bias control method. The child Mach-Zehnder Interferometer (MZI) that handles in-phase signals is referred to as "MZC-I", the child MZI that handles quadrature-phase signals is referred to as "MZC-Q", and the parent MZI is referred to as "MZP". In the following description, the term "bias" or "bias voltage" means a DC bias voltage unless otherwise specified.

In the control section for one of the child MZIs (for example, MZC-I), the dither signal D1 is superimposed onto the bias voltage for MZC-I to swing the optical phase of MZC-I in the positive and negative directions. A "dither signal" is a low-frequency signal oscillating at a small amplitude. The "small amplitude" is an amplitude of, for example, several millivolts (mV) to several tens of mV. The "low frequency" is a frequency of about several Hz to several hundred Hz, which is sufficiently lower than the drive frequency of the electro-optic modulator.

The dither signal D1 oscillates at, for example, the bottom of the modulation curve (i.e., the voltage vs. power characteristic curve). If the bias voltage of MZC-I is at the optimum point (namely, the bottom of the modulation curve in this example), the output of the electro-optic modulator contains a component that oscillates at double frequency of D1. When the bias voltage of MZC-I deviates from the optimum point or the bottom, a component that changes at the same frequency as D1 (D1 response) appears in the output of the electro-optic modulator, in addition to the component of the double frequency of D1. By controlling the bias voltage of MZC-I such that that the detected D1 response approaches zero, the phase of MZC-I is converged to the optimum point.

In the control section for the other of the child MZIs (for example, MZC-Q), the dither signal D2 is superimposed on the bias voltage for MZC-Q to swing the optical phase of MZC-Q in the positive and negative directions. If the bias voltage of MZC-Q is at the optimum point, a component that changes at the same frequency as D2 (D2 response), as well as the double frequency component of D2, are contained in the output of the electro-optic modulator. By controlling the bias voltage of MZC-Q such that the D2 response approaches zero, the phase of MZC-Q is converged to the optimum point.

In the control section for MZP, the phase of the bias voltage of one of the child MZIs, for example, MZC-I is offset in one direction (for example, the positive direction), and the dither signal D3 is applied to MZC-Q to extract the D3 response from the output of the electro-optic modulator. Next, the phase of the bias voltage of the MZC-I is offset in the opposite direction (for example, the negative direction), and the dither signal D4 is applied to the MZC-Q to extract the D4 response from the output of the electro-optic modulator.

The phase error information for controlling the bias voltage of MZP is represented by the difference between the D3 response and the D4 response. The dither signals are superimposed only onto the child MZIs, and the MZC-I control information, the MZC-Q control information, and the MZP control information are extracted one by one by four operations within a control loop.

The method of FIG. 1 can bring the bias voltages of the three MZIs to converge to the optimum points only by detecting the responses of the dither signals applied to the child MZIs. However, it is difficult to achieve tolerance to noise, together with the stable convergence. In particular, the phase error information of MZP, which is extracted as a difference between the D3 response and the D4 response, has a small amplitude, and it is difficult to improve the tolerance to noise, while maintaining control stability.

A typical technique for increasing tolerance to noise in digital control is to increase the number of samplings and smooth the noise. However, the processing capacity of the processor is finite, and there is an upper limit to the sampling frequency.

In the embodiment, different dither signals are simultaneously applied to the two child MZIs, and phase error information for the MZP is extracted twice, in addition to the phase error information for the MZC-I and the phase error information for the MZC-Q, within one control loop. By doubling the extraction frequency of the MZP phase error information, noise can be smoothed, while maintaining the stability of bias convergence. The particulars of the process for extracting the MZP phase error information twice in a control loop will be described below.

Configuration of Optical Transmitter of Embodiment

Figure 2:
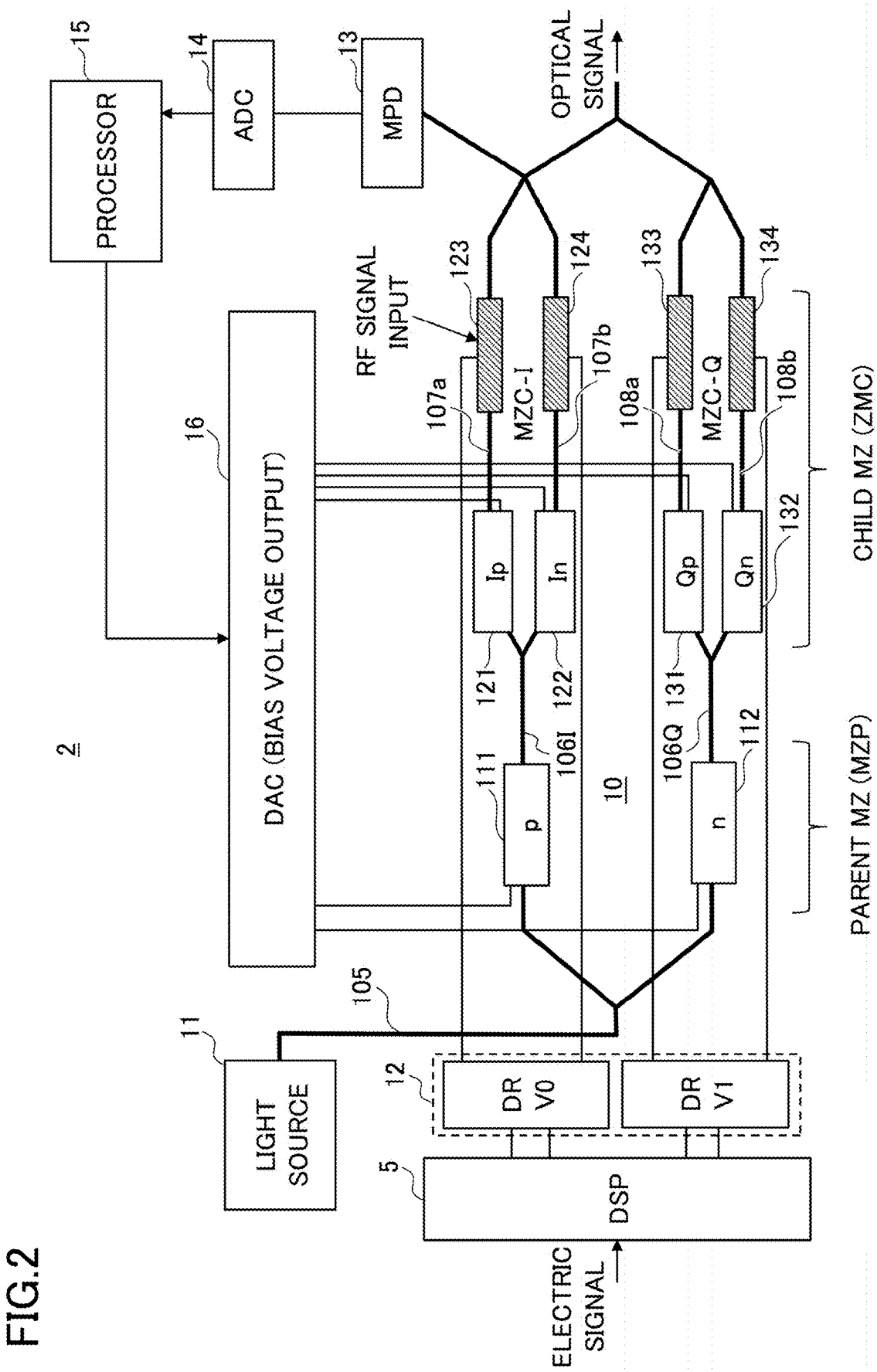
FIG. 2 is a schematic diagram of an optical transmitter according to an embodiment.

FIG. 2 is a schematic diagram of an optical transmitter 2 to which the bias control of the embodiment is applied. The optical transmitter 2 is a digital coherent transmitter, and has an electro-optic modulation system including a digital signal processor (DSP) 5, an electric circuit 12, an electro-optic modulator 10, and a light source 11. As a bias control system of the optical transmitter 2, a monitor photodetector (denoted as "MPD" in the FIG. 13, an analog-to-digital converter (ADC) 14, a processor 15, and a digital-to-analog converter (DAC) 16 are provided.

The light source 11 is a laser light source that outputs a light beam having a uniform phase. The light source 11 may be a wavelength-tunable laser diode, depending on the configuration and functions of the optical transmitter 2. If a wavelength-tunable laser diode is used, an integrated tunable laser assembly (ITLA), in which a control circuit for regulating a heater current, a temperature, etc. are integrated, may be used. The light beam emitted from the light source 11 is incident on the electro-optic modulator 10 through the optical waveguide 105, and is modulated by the data signal output from the DSP 5.

The electro-optic modulator 10 has an MZP configured by two nesting child MZIs (MZC-I and MZC-Q) connected in parallel, and it performs QPSK. Of the electro-optic modulators 10, the branch containing MZC-I is called an I lane, and the branch containing MZC-Q is called a Q lane. Two waveguides 107a and 107b of the MZC-I are provided with signal electrodes 123 and 124, respectively, and bias electrodes 121 and 122, respectively. Two waveguides 108a and 108b of the MZC-Q are provided with signal electrodes 133 and 134, respectively, and bias electrodes 131 and 132, respectively.

The first data signal set (including a non-inverted data signal and an inverted data signal) is input to the pair of signal electrodes 123 and 124. A second data signal set (including a non-inverted data signal and an inverted data signal) is input to the pair of signal electrodes 133 and 134. The first data signal set is a drive signal generated by the driver DRV0 of the electric circuit 12, based on the logical value of the I-lane data signal output from the DSP 5. The second data signal is a drive signal generated by the driver DRV1 of the electric circuit 12, based on the logical value of the Q-lane data signal output from the DSP 5.

Positive-phase and negative-phase I bias voltages are applied to the MZC-I bias electrodes 121 and 122, and positive-phase and negative-phase Q bias voltages are applied to the MZC-Q bias electrodes 131 and 132. Bias voltages which provides a phase difference of π/2 (radians) between the light beams modulated by the I lane and the Q lane are applied to the bias electrodes 111 and 112 of the MZP. The light beams modulated by the MZC-I and MZC-Q are multiplexed with a phase difference of π/2 between them, and the multiplexed light is output as the optical signal from the electro-optic modulator 10.

In the bias control system, the monitor photodetector 13 monitors a portion of the optical signal output from the electro-optic modulator 10. The output of the monitor photodetector 13 is connected to the input of the ADC 14, and converted into a digital signal by the ADC 14, which is then input to the processor 15. The processor 15 applies dither signals to the MZC-I and MZC-Q at the same time, and controls the bias voltages of MZC-1, MZC-Q, and MZP, based on the detection result of the dither components (referred to as "dither responses") contained in the output light of the electro-optic modulator 10. The bias control signals output from the processor 15 are converted by the DAC 16 into analog electric signals (bias voltages), and the bias voltages are applied to the corresponding bias electrodes of the electro-optic modulator 10.

Figure 3:
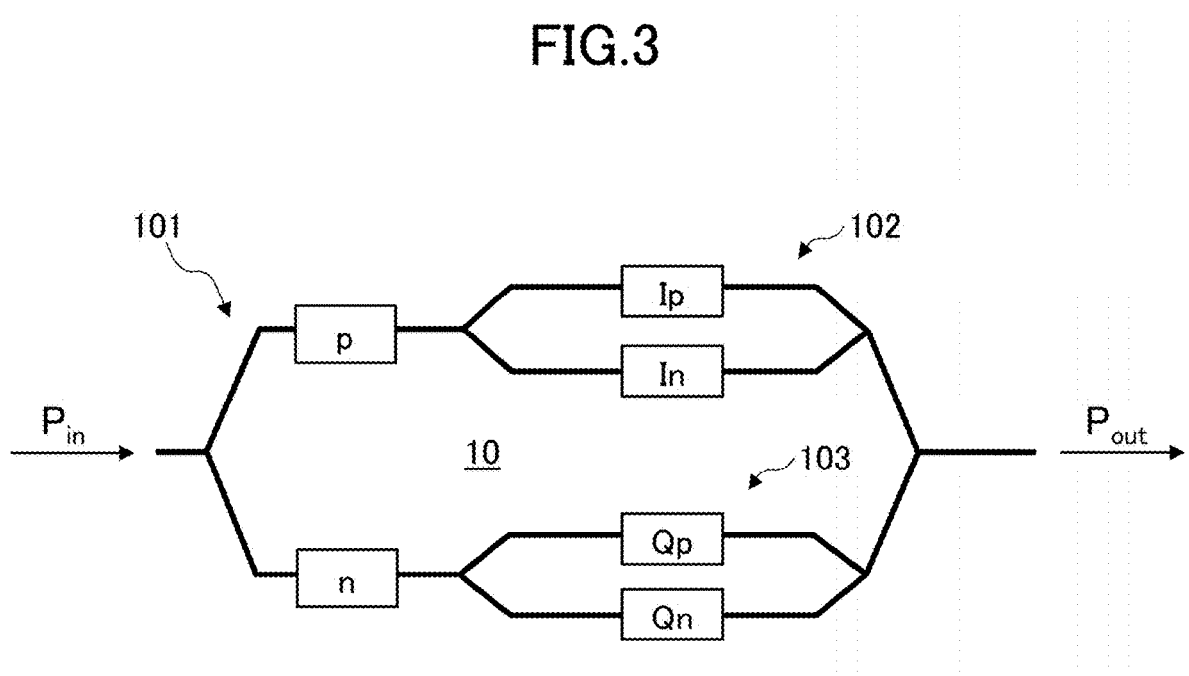
FIG. 3 illustrates a basic configuration of bias control on an electro-optic modulator that performs QPSK.

FIG. 3 illustrates the basic configuration of bias control on the electro-optic modulator 10 which performs QPSK. In phase modulation, if the central phase of each MZI deviates from the optimum point, the characteristics of the modulated signal deteriorate, and therefore, bias control is performed so that the optimum phase is maintained at each of the MZIs. It is assumed that unmodulated continuous wave is incident on the electro-optic modulator 10. Let the child MZI 102 be MZC-I, the child MZI 103 be MZC-Q, and the parent MZI 101 be MZP. The phases of MZC-I, MZC-Q, and MZP are denoted as $\varphi_I$, $\varphi_Q$, and $\varphi_P$, respectively.

With the split ratio of the electro-optic modulator 10 as 1 to 1 (1:1), the optical output power $P_{out}$ of the electro-optic modulator 10 is proportional to the right-hand side of Formula (1).

$$P_{out} \propto \cos^2\varphi_I + \cos^2\varphi_Q - 2\cos 2\varphi_P \cdot \cos \varphi_I \cos \varphi_Q \quad (1)$$

With a QPSK modulation scheme, each of the child MZIs is controlled to the phase (Null point) at which the optical output power $P_{out}$ is minimized, and the parent MZI is control to the phase (Quad pint) at which the phase difference between the light beams modulated in the I lane and the Q lane is 90 degrees.

In Formula (1) for calculating the optical output power $P_{out}$ of the electro-optic modulator 10, the condition that the child MZI is at the Null point and that the parent MZI is at the Quad point is expressed by the following equations.

$$\varphi_I = \frac{\pi}{2} + n\pi,$$

$$\varphi_Q = \frac{\pi}{2} + m\pi,$$

$$\varphi_P = \frac{\pi}{4} + \frac{l\pi}{2}$$

In the absence of data input, a phase difference of π radians is given between the two waveguides forming the child MZI of each of the I lane and the Q lane, and in MZP, a phase difference of π/2 radians is given between the I lane and the Q lane.

In order to improve the visibility of the calculation of Formula (1), the phases $\varphi_I$, $\varphi_Q$, and $\varphi_P$ are replaced with $\varphi'_I$, $\varphi'_Q$, and $\varphi'_P$ as follows.

$$\varphi'_I = \varphi_I - \frac{\pi}{2},$$

$$\varphi'_Q = \varphi_Q - \frac{\pi}{2},$$

$$\varphi'_P = \varphi_P - \frac{\pi}{4}$$

By this replacement, the arithmetic expression of the optical output power $P_{out}$ becomes Formula (2).

$$P_{out} \propto \sin^2\varphi'_I + \sin^2\varphi'_Q + 2\sin 2\varphi'_P \cdot \sin \varphi'_I \sin \varphi'_Q \quad (2)$$

Thus, Formula (2) illustrated in FIG. 3 is derived.

In ABC control, the initial phases are set so as to satisfy or closely meet with the relationship of $\varphi'_I = \varphi'_Q = \varphi'_P = 0$, based on the phase characteristics of the respective MZIs measured in advance. During, the bias control, feedback control is carried out such that the phase relationship approaches $\varphi'I = \varphi'Q = \varphi'P = 0$, which is one of the optimum conditions for phase biases.

Bias Control of Embodiment

Figure 4:
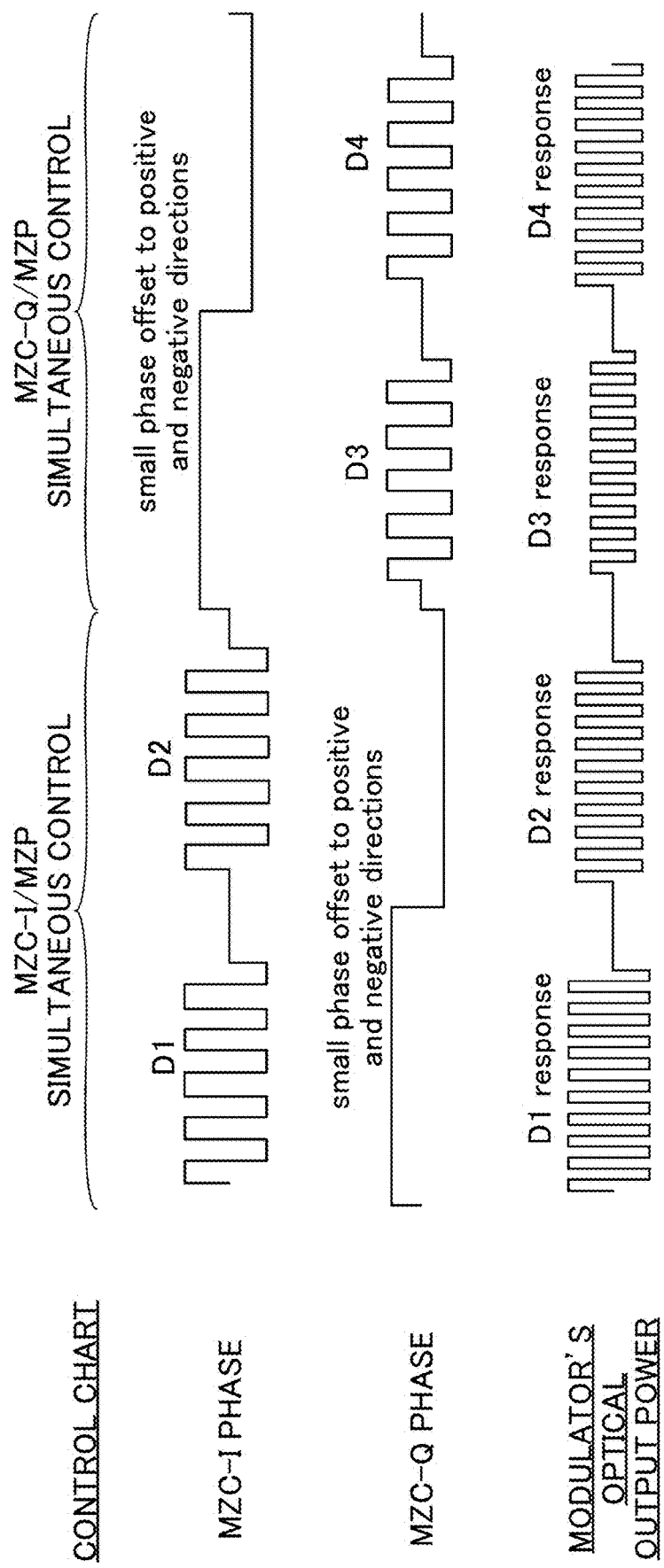
FIG. 4 illustrates a control scheme on an electro-optic modulator according to an embodiment.

FIG. 4 illustrates a bias control scheme for the electro-optic modulator 10 according to an embodiment. Dither signals are simultaneously applied to MZC-I and MZC-Q, while no dither signal is applied to the parent MZI. The I bias and the Q bias are controlled, each once in a control loop, and the parent bias is controlled twice (the first-round control and the second-round control) within the control loop.

In the first control section of a control loop, control information items of MZP and one of the child MZIs (for example, MZC-I) are extracted. In the second control section of the control loop, control information items of MZP and the other of the child MZIs (for example, MZC-Q) are extracted. The total of four control information items are extracted within one control loop. Two of the four control information items are control information for the parent bias. The bias "control information" may be rephrased as the phase error information contained in the output light of the electro-optic modulator 10, because the bias voltages of the respective MZIs are controlled so that the phase errors approach zero. Extracting two bias control information items for the parent bias within a single control loop is equivalent to doubling the sampling of MZP phase error information.

In the first control section for controlling the bias voltages of MZC-I and MZP, the phase of the bias voltage of MZC-Q is slightly shifted in one direction (e.g., the positive direction), while applying the dither signal D1 to MZC-I. A D1 response synchronized with the dither signal D1 is extracted from the output light of the electro-optic modulator 10. Next, the phase of the bias voltage of the MZC-Q is slightly shifted in the opposite direction (e.g., the negative direction), while applying the dither signal D2 to the MZC-I. A D2 response synchronized with the dither signal D2 is extracted from the output light of the electro-optic modulator 10. Dither signals D1 and D2 may be the same or different.

In the second control section for controlling the bias voltages of the MZC-Q and MZP, the phase of the bias voltage of MZC-I is slightly shifted in one direction (e.g., the positive direction), and the dither signal D3 is applied to MZC-Q. A D3 response synchronized with the dither signal D3 is extracted from the output of the electro-optic modulator 10. Then, the phase of the bias voltage of the MZC-I is slightly shifted in the opposite direction (e.g., the negative direction), and the dither signal D4 is applied to the MZC-Q. A D4 response synchronized with the dither signal D4 is extracted from the output of the electro-optic modulator 10. The dither signals D3 and D4 may be the same or different.

The MZC-I control information extracted in the first control section is the average of the D1 response and the D2 response, and the MZP control information extracted in the first control section is the difference or ratio between the D1 response and the D2 response. In MZC-I, the I bias is controlled so that the average value of the D1 response and the D2 response approaches zero, or that the absolute value becomes the minimum. If the difference between D1 response and the D2 response is used for the MZP control, the bias voltage of the MZP is controlled so that the difference between the D1 response and the D2 response approaches zero, or that the absolute value is minimized. If the ratio between D1 response and D2 response is used for the MZP control, the parent bias is controlled so that the ratio approaches 1.

The MZC-Q control information extracted in the second control section is the average of the D3 response and the D4 response, and the MZP control information is the difference or ratio between the D3 and the D4 response. In MZC-Q, the Q bias is controlled so that the average value of the D4 response of the D3 response approaches zero, or that the absolute value becomes the minimum. If the difference between the D3 response and D4 response is used for the MZP control, the bias voltage of MZP is controlled so that the difference between the D3 response and the D4 response approaches zero, or that the absolute value is minimized. If the ratio between the D3 response and D4 response is used, the parent bias is controlled so that the ratio approaches 1.

The D1 response component, the D2 response component, the D3 response component, and the D4 response component, which are synchronized with the dither signals D1, D2, D3, and D4, respectively, can be extracted by, for example, a bandpass filter (BPF).

Comparing the control scheme of FIG. 4 with the conventional method of FIG. 1, the dither signals are superimposed only onto the child MZIs, and two control information items for MZC-I and MZC-Q, and two control information items for MZP are acquired by four operations within one control loop. By simultaneously performing the feedback control operations for the parent MZI and one of the child MZIs in each control section of the control loop, the control frequency of the parent MZI can be doubled, without increasing the number of operations per loop or the control time constant. This control scheme can smooth the noise, and improve the stability of convergence.

Figure 5:
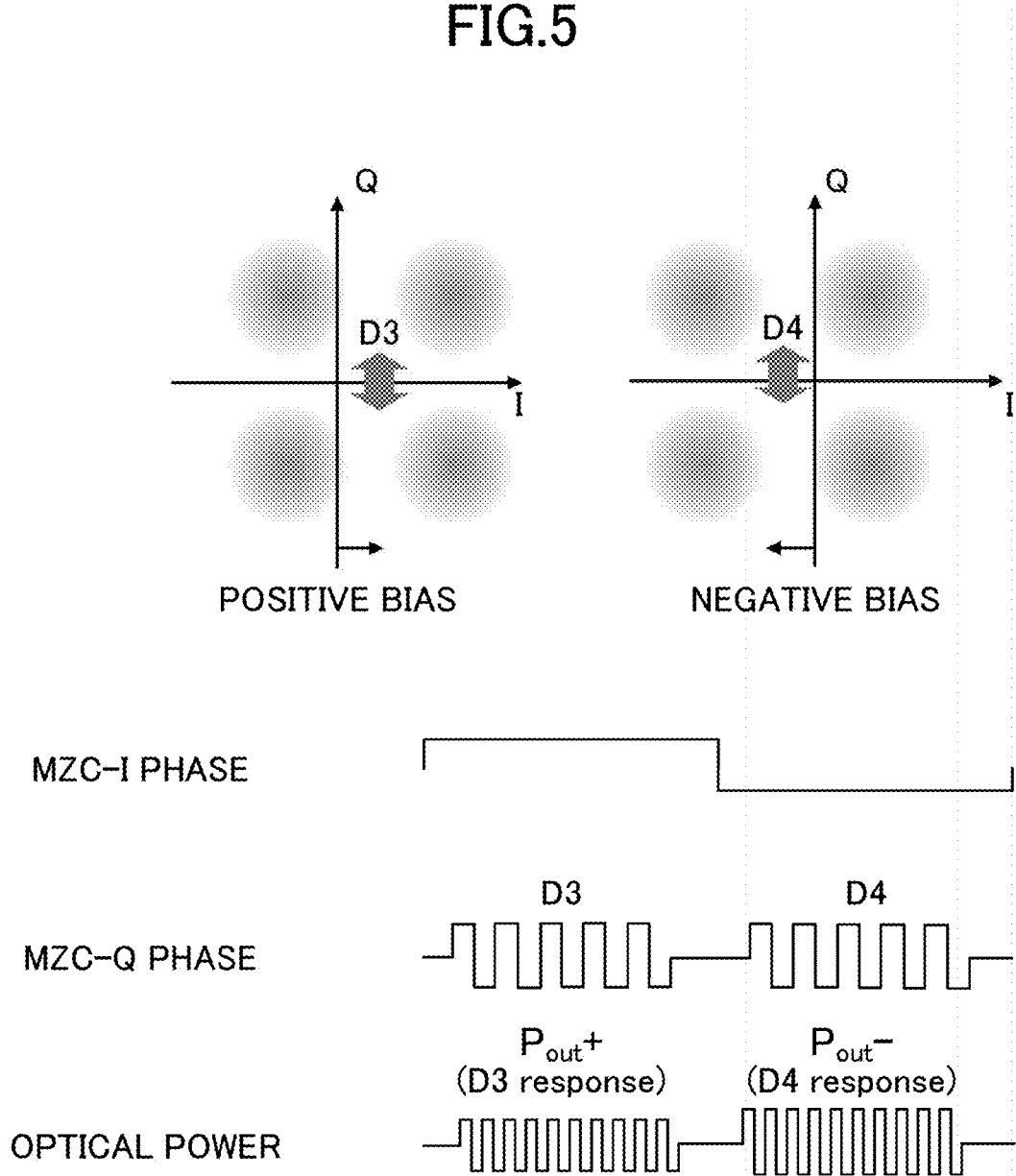
FIG. 5 illustrates particulars of the control on the parent MZI in the control scheme of FIG. 4.

FIG. 5 illustrates particulars of the control on the parent MZI in the control scheme of FIG. 4. Focusing on, for example, the second control section of FIG. 4, the modulated light can be developed on the IQ complex plane at four signal points which are 90-degrees out of phase with each other. The phase of MZC-I is slightly shifted in the positive direction for a certain period of time, and then the phase of the MZC-I is shifted in the negative direction to the same extent and for the same period of time. This operation is equivalent to applying a DC-like dither signal having a long period onto the I bias. During one cycle of the phase change of the MZC-I, dither signals D3 and D4, which oscillate in shorter periods than the DC-like dither, are applied to the MZC-Q.

In the section where the positive bias is applied to the I lane, the component synchronized with the dither signal D3 is extracted as the D3 response from the optical output power $P_{out}+$ of the electro-optic modulator 10. In the section where the negative bias is applied to the I lane, the component synchronized with the dither signal D4 is extracted as the D4 response from the optical output power $P_{out}-$ of the electro-optic modulator 10. By simultaneously applying different dither signals to the MZC-I and MZC-Q, the dither responses of the electro-optic modulator 10 are detected, while changing the phase in four directions on the IQ complex plane. If the magnitude of the detected dither response is constant regardless of the direction of phase change of the child MZI, the orthogonality between the MZC-I and MZC-Q can be regarded as maintained.

<Control Flow>

Figure 6:
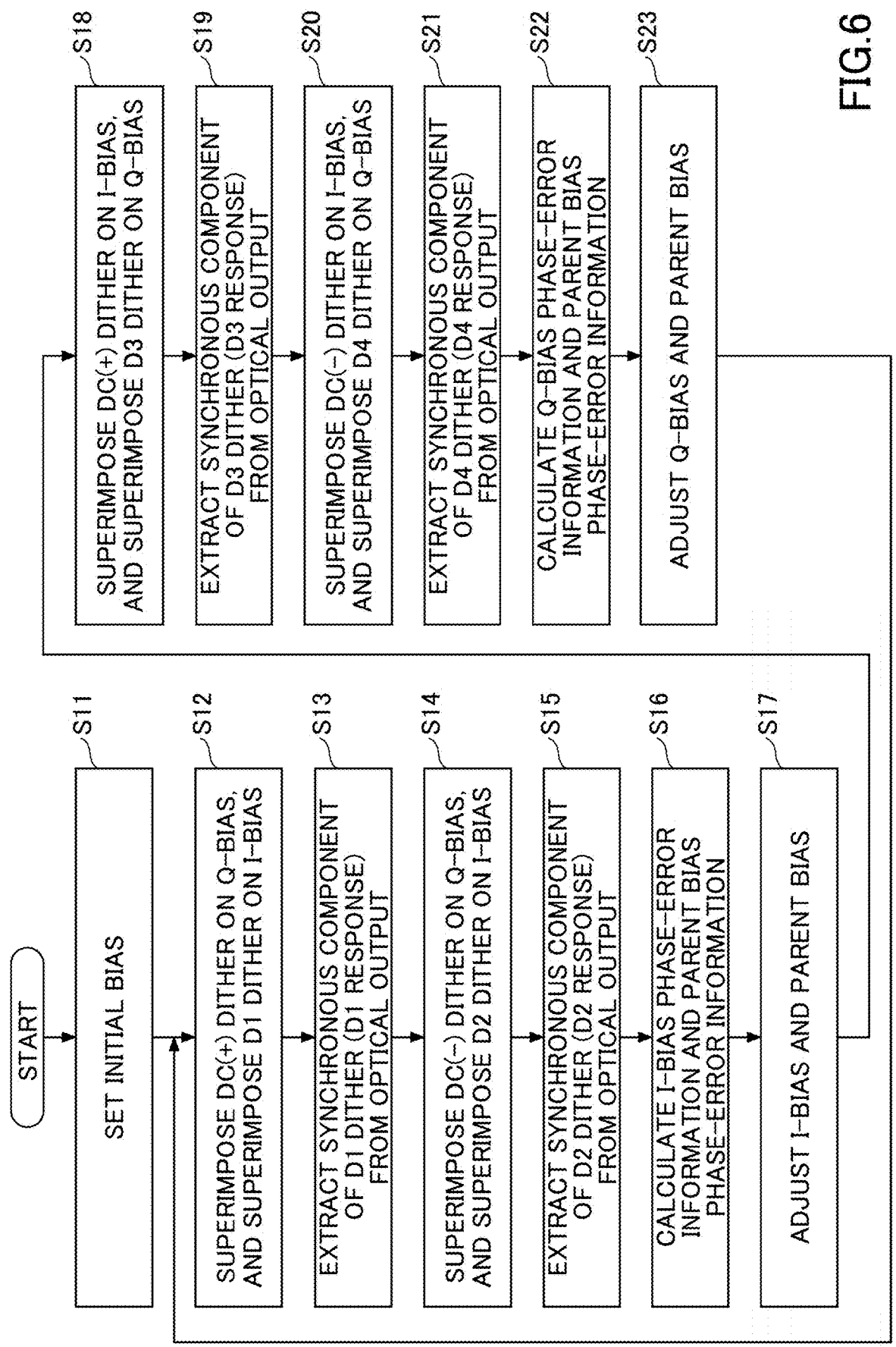
FIG. 6 is a flowchart of a method of controlling an electro-optic modulator according to an embodiment.

FIG. 6 is a flowchart of a method of controlling the electro-optic modulator 10. First, the initial bias voltages are set in the electro-optic modulator 10 (S11). As described above, the initial bias voltages are set such that the phase rotations φ of the respective MZIs satisfy or closely meet with the relationship of $\varphi'_I=\varphi'_Q=\varphi'_P=0$ based on the phase characteristics of the respective MZIs measured in advance.

Then, a DC-like dither with a phase offset in the positive direction (which is called "DC (+) dither" for convenience) is superimposed onto the bias voltage (for example, Q bias) of one of the child MZIs for a certain period of time (during the first sub-section of the MZC-I/MZP simultaneous control section). At the same time, a dither signal D1 which oscillates with a period shorter than that of the DC(+) dither is superimposed onto the bias voltage (for example, I bias) of the other of the child MZIs (S12). A portion of the output light of the electro-optic modulator 10 is monitored, and a component (D1 response) synchronized with the dither signal D1 is extracted from the optical output monitoring result (S13).

While the DC-like dither changes to the opposite direction and a phase offset in the negative direction (DC-like dither is called "DC(−) dither" for convenience) is provided for the Q bias, a dither signal D2 having a period shorter than that of the DC(−) dither is superimposed on the I bias, in the second sub-section of the MZC-I/MZP simultaneous control section (S14). The dither signal D2 may be the same as or different from the dither signal D1. A portion of the output light of the electro-optic modulator 10 is monitored, and a component (D2 response) synchronized with the dither signal D2 is extracted from the optical output monitoring result (S15).

Based on the extracted D1 response and D2 response, phase error information (representing the average of the D1 response and D2 response) for controlling the I bias, and first-round phase error information (representing the difference or ratio between the D1 response and D2 response) for controlling the parent bias, are calculated (S16). The I bias and the parent bias of the electro-optic modulator 10 are adjusted with appropriate amounts of control, each proportional to the corresponding calculated phase error, in the MZC-I/MZP simultaneous control section (S17).

Next, the dither signals applied to the child MZIs are replaced. In this example, DC(+) dither is superimposed onto the I bias, and a dither signal D3 having a period shorter than that of the DC(+) dither is superimposed onto the Q bias, in the first subsection of the MZC-Q/MZP simultaneous control section (S18). A portion of the output light of the electro-optic modulator 10 is monitored, and a component (D3 response) synchronized with the dither signal D3 is extracted from the monitoring result (S19). Subsequently, a DC(−) dither is superimposed onto the I bias, and a dither signal D4 having a period shorter than that of the DC(−) dither is superimposed onto the Q bias, in the second subsection of the of the MZC-Q/MZP simultaneous control section (S20). A portion of the output light of the electro-optic modulator 10 is monitored, and a component (D4 response) synchronized with the dither signal D4 is extracted from the monitoring result (S21).

Based on the extracted D3 response and D4 response, phase error information (representing the average of the D3 response and the D4 response) for controlling the Q bias, and phase error information (representing the difference or ratio between the D3 response and the D4 response) for controlling the parent bias, are calculated (S22). The Q bias and the parent bias of the electro-optic modulator 10 are adjusted with appropriate amounts of control, each proportional to the associated phase error (S23).

Upon the end of this control loop, the process returns to step S12 and the next control loop is executed. By repeating the control loop, the I bias, the Q bias, and the parent bias converge to the optimum points. The phase error information of the parent bias, which is a minute signal, is extracted twice within a single control loop, and thus the noise contained in the phase error information of the parent bias can be smoothed.

<Mathematical Verification of Advantageous Effect>

The advantageous effect of the control process shown in FIG. 4 is verified by mathematical formulas, compared with the conventional control method of FIG. 1.

First, if a dither signal of $\varphi_{dI}$ is applied to MZC-I by the control method of FIG. 1, the optical output power $P_{out}$ of the electro-optic modulator 10 is proportional to the right-hand side of Formula (3).

$$P_{out} \propto \sin^2(\varphi'_I + \varphi_{dI}) + \sin^2 \varphi'_Q + 2 \sin 2\varphi'_P \cdot \sin(\varphi'_I + \varphi_{dI}) \cdot \sin \varphi'_Q \quad (3)$$

If $\varphi_{dI}$ is sufficiently small, $\sin \varphi_{dI}$ is approximated to $\varphi_{dI}$ ($\sin \varphi_{dI} \approx \varphi_{dI}$), $\cos \varphi_{dI}$ is approximated to 1 ($\cos \varphi_{dI} \approx 1$), and the second harmonic component can be ignored.

By rearranging Formula (3) under the above-described assumption, the right-hand side of Formula (3) is expressed as follows.

$$\underbrace{\sin^2 \varphi'_I + \sin^2 \varphi'_Q + 2\sin 2\varphi'_P \cdot \sin\varphi'_I \cdot \sin\varphi'_Q}_{\text{bias component}} +$$

$$\underbrace{\varphi_{dI}(\sin 2\varphi'_I + 2\sin 2\varphi'_P \cdot \sin\varphi'_Q \cdot \cos\varphi'_I)}_{\text{synchronous dither component}}$$

By extracting the component synchronized with the dither signals from the above-noted expression, a dither response proportional to Formula (4) is acquired.

$$f(\varphi_{dI})(\sin 2\varphi'_I + 2 \sin 2\varphi'_P \cdot \sin \varphi'_Q \cdot \cos \varphi'_I) \quad (4)$$

In Formula (4), $f(\varphi_{dI})$ is a dither response function of extracting a specific frequency component from the optical output power $P_{out}$ of the electro-optic modulator 10.

If the bias condition is close to the optimum point ($\varphi'_I = \varphi'_Q = \varphi'_P = 0$) to some extent, the second term of Formula (4) becomes smaller, and the first term is approximately proportional to $\varphi'_I$. In other words, linear feedback control can be applied to the bias control for the child MZI. This also applies to the Q lane. In fact, the bias condition does not converge at once to $\varphi'_I = \varphi'_Q = \varphi'_P = 0$, and so, with the conventional method of FIG. 1, MZC-I, MZC-Q, and MZP are controlled in turn so as to get closer to the optimum point.

As to the control on the parent bias illustrated in FIG. 1, the parent bias is controlled only once in a control loop. In calculation, a bias $\pm \varphi_{dI\_DC}$, which changes with a long period in a DC-like manner, is applied to MZC-I, while a dither signal of $\varphi_{dQ}$ is applied to MZC-Q.

The optical output powers $P_{out}+$ and $P_{out}-$ of the electro-optic modulator 10 are proportional to the components expressed by the following formulas.

$$P_{out+} \propto \sin^2(\varphi'_I + \varphi_{dI\_DC}) + \sin^2(\varphi'_Q + \varphi_{dQ}) + 2 \sin 2\varphi'_P \cdot \sin(\varphi'_I + \varphi_{dI\_DC}) \cdot \sin(\varphi'_Q + \varphi_{dQ})$$

$$P_{out-} \propto \sin^2(\varphi'_I - \varphi_{dI\_DC}) + \sin^2(\varphi'_Q + \varphi_{dQ}) + 2 \sin 2\varphi'_P \cdot \sin(\varphi'_I - \varphi_{dI\_DC}) \cdot \sin(\varphi'_Q + \varphi_{dQ})$$

Similar to the child MZI, the extraction results of the synchronous components synchronized with the dither signal of $\varphi_{dQ}$ from the optical output powers $P_{out}+$ and $P_{out}-$, respectively, are expressed by the following formulas.

$$f(\varphi_{dQ})(\sin 2\varphi'_Q + 2 \sin 2\varphi'_P \cdot \sin(\varphi'_I + \varphi_{dI\_DC}) \cdot \cos \varphi'_Q)$$

$$f(\varphi_{dQ})(\sin 2\varphi'_Q + 2 \sin 2\varphi'_P \cdot \sin(\varphi'_I - \varphi_{dI\_DC}) \cdot \cos \varphi'_Q)$$

By subtracting the two extraction results of the synchronous components, Formula (5) is derived.

$$f(\varphi_{dQ})(\sin 2\varphi'_Q + 2 \sin 2\varphi'_P \cdot \sin(\varphi'_I + \varphi_{dI\_DC}) \cdot \cos \varphi'_Q) - f(\varphi_{dQ})(\sin 2\varphi'_Q + 2 \sin 2\varphi'_P \cdot \sin(\varphi'_I - \varphi_{dI\_DC}) \cdot \cos \varphi'_Q) = 4\varphi_{dI\_DC} \cdot f(\varphi_{dQ}) \cdot \sin 2\varphi'_P \cdot \cos \varphi'_I \cdot \cos \varphi'_Q \quad (5)$$

If the bias condition is close to the optimum, point ($\varphi'_I = \varphi'_Q = \varphi'_P = 0$) to some extent, Formula (5) is approximately proportional to $\varphi'_P$, so linear feedback control can be applied to the parent bias.

Next, the control method of the embodiment illustrated in FIG. 4 is explained using mathematical formulas.

In the control method of FIG. 4, dither signals are simultaneously superimposed onto MZC-I and MZC-Q. The D1 response and the D1 response extracted in the first control section (labeled as "MZC-I/MZP simultaneous control" section in FIG. 4) are expressed as follows.

$$D1\ \text{response:} f(\varphi_{dI})(\sin 2\varphi'_I + 2 \sin 2\varphi'_P \cdot \sin(\varphi'_Q + \varphi_{dQ\_DC}) \cdot \cos \varphi'_I)$$

$$D2\ \text{response:} f(\varphi_{dI})(\sin 2\varphi'_I + 2 \sin 2\varphi'_P \cdot \sin(\varphi'_Q - \varphi_{dQ\_DC}) \cdot \cos \varphi'_I)$$

In the above-noted formulas, $\varphi_{dQ\_DC}$ denotes the phase of the DC like dither signal applied to the Q lane in the MZC-I/MZP simultaneous control section.

As the optical phases of the I lane and the Q lane which constitute the MZP approach 90-degrees out of phase, the above-noted two formulas representing the D1 response and the D2 response, respectively, gradually approach each other.

The average of the two formulas, which represent the D1 response and the D2 response, respectively, is expressed by Formula (6).

$$f(\varphi_{dI})(\sin 2\varphi'_I + 2 \sin 2\varphi'_P \cdot \sin \varphi'_Q \cdot \cos \varphi_{dQ\_DC} \cdot \cos \varphi'_I) \quad (6)$$

Comparing Formula (6) with Formula (4) of the method of FIG. 1, the difference is the term of "$\cos \varphi_{dQ\_DC}$". If $\cos \varphi_{dQ\_DC}$ is small, $\cos \varphi_{dQ\_DC}$ approximates to 1 ($\cos \varphi_{dQ\_DC} \approx 1$). Therefore, Formula (6) and Formula (4) take almost the same values. The same applies to the Q lane. That is, the phase error information extracted by the control method of FIG. 4 for controlling the bias of the child MZI is the same as that extracted in the control method of FIG. 1.

Next, the control on the parent bias is considered. A D1 response, a D2 response, a D3 response, and a D4 response, each synchronized with the associated dither signal, are detected from the output optical power of the electro-optic modulator, as illustrated in FIG. 4.

The difference between the D1 response and the D2 response, and the difference between the D3 response and the D4 response are calculated, which are expressed by Formula (7).

$$(D1\text{-}D2)\text{response}: 4\varphi_{dI\_DC} \cdot f(\varphi_{dQ}) \cdot \sin 2\varphi'_P \cdot \cos \varphi'_I \cos \varphi'_Q$$

$$(D3\text{-}D4)\text{response}: 4\varphi_{dQ\_DC} \cdot f(\varphi_{dI}) \cdot \sin 2\varphi'_P \cdot \cos \varphi'_I \cos \varphi'_Q \quad (7)$$

If application of the dither signals is symmetrical between the I lane and the Q lane, that is, if the dither signals applied to the I lane and the Q lane are exchanged in the first control section and the second control section, then the two expressions included in Formula (7) are equivalent. This means that the parent bias is effectively controlled twice. Although symmetrical dither application between the I lane and the Q lane is not essential, the double sampling effect can be clearly understood based on mathematical calculation by assuming the symmetrical dither application.

<Modification Example of Bias Control>

Figure 7:
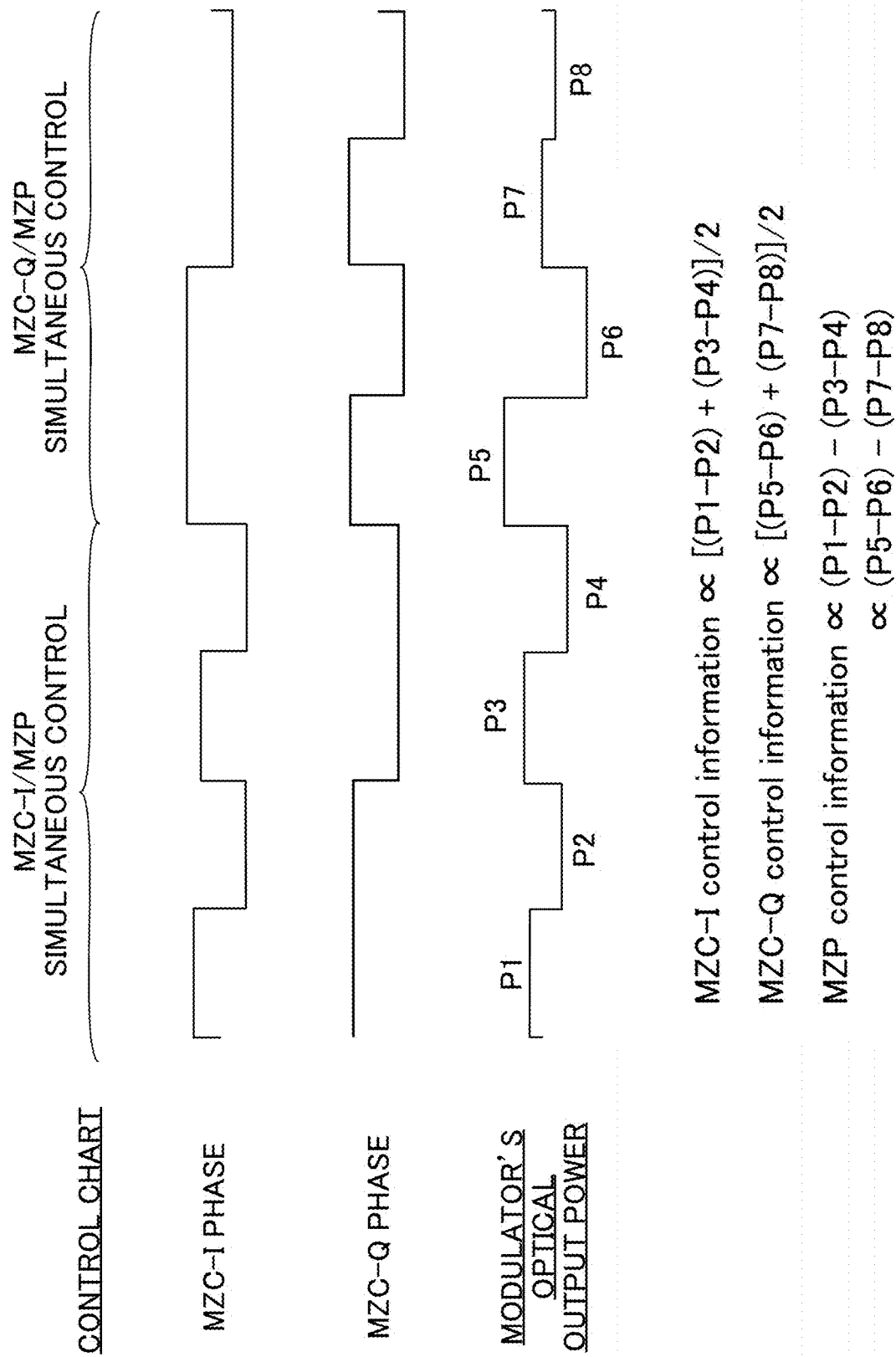
FIG. 7 illustrates an example of bias control using a DC-like dither signal.

FIG. 7 illustrates a modification example of bias control, in which DC-like dither signals are used for both the I lane and the Q lane. The control scheme of FIG. 7 also employs synchronous detection of dither components, and dither responses can be extracted from the output light of the electro-optic modulator 10 without using a BPF.

In the first control section (MZC-I/MZP simultaneous control section) of the control loop, a first DC-like dither signal is applied to MZC-Q, while a second DC like dither signal, which is different from the first DC-like dither signal, is applied to MZC-I. In this example, the second DC-like dither signal changes twice as fast as the first DC-like dither signal.

In the first control section, synchronous components P1, P2, P3, and P4 synchronized with the DC-like dither signal applied to the MZC-T are extracted by ADC 14 from the output light of the electro-optic modulator 10.

In the second control section (MZC-Q/MZP simultaneous control section), the DC-like dither signals applied to the I lane and the Q lane are exchanged. From the output light of the electro-optic modulator 10, synchronous components P5, P6, P7, and P8 synchronized with the DC-like dither signal applied to the MZC-Q are extracted by the ADC 14.

The control information (i.e., the phase error information) for the MZC-I is proportional to [(P1−P2)+(P3−P4)]/2, which is the average of the dither response acquired when the optical phase of the Q lane is slightly shifted in the positive direction and the dither response acquired when the optical phase of the Q lane is slightly shifted in the negative direction.

The control information (i.e., the phase error information) for the MZC-Q is proportional to [(P5−P6)+(P7−P8)]/2, which is the average of the dither response acquired when the optical phase of the I lane is slightly shifted in the positive direction and the dither response acquired when the optical phase of the I lane is slightly shifted in the negative direction.

Phase error information that becomes the basis of MZP control is extracted twice within a single control loop. The phase error information for the MZP extracted in the first control section is a difference or ratio between the dither response acquired when the optical phase of the Q lane is slightly shifted in the positive direction and the dither response acquired when the optical phase of the Q lane is slightly shifted in the negative direction. The phase error information for the MZP extracted in the second control section is a difference or ratio between the dither response acquired when the optical phase of the I lane is slightly shifted in the positive direction and the dither response acquired when the optical phase of the I lane is slightly shifted in the negative direction.

The control scheme of FIG. 7 is a modification of the control scheme of FIG. 4. The variable of the function $f(\varphi_d)$, which defines extraction of the frequency component synchronized with the dither signal of $\varphi_d$ from the optical output powers $P_{out}+$ and $P_{out}-$ of the electro-optic modulator 10, is replaced with $2 \times \varphi_{d\_DC}$. The dither responses detected by the control scheme of FIG. 7 are small, and accordingly, it may be desirable to use a sample and hold circuit and a differential amplifier in or outside the processor 15.

The control scheme of FIG. 7 can also double the control frequency for the parent-MZI bias, without increasing the the number of operations or the control time constant, by simultaneously, performing the feedback control operations for the parent MZI and one of the child MZIs in each control section of the control loop. This control scheme enables smoothing of the noise and improves the stability of convergence.

<Application to Optical Transceivers>

Figure 8:
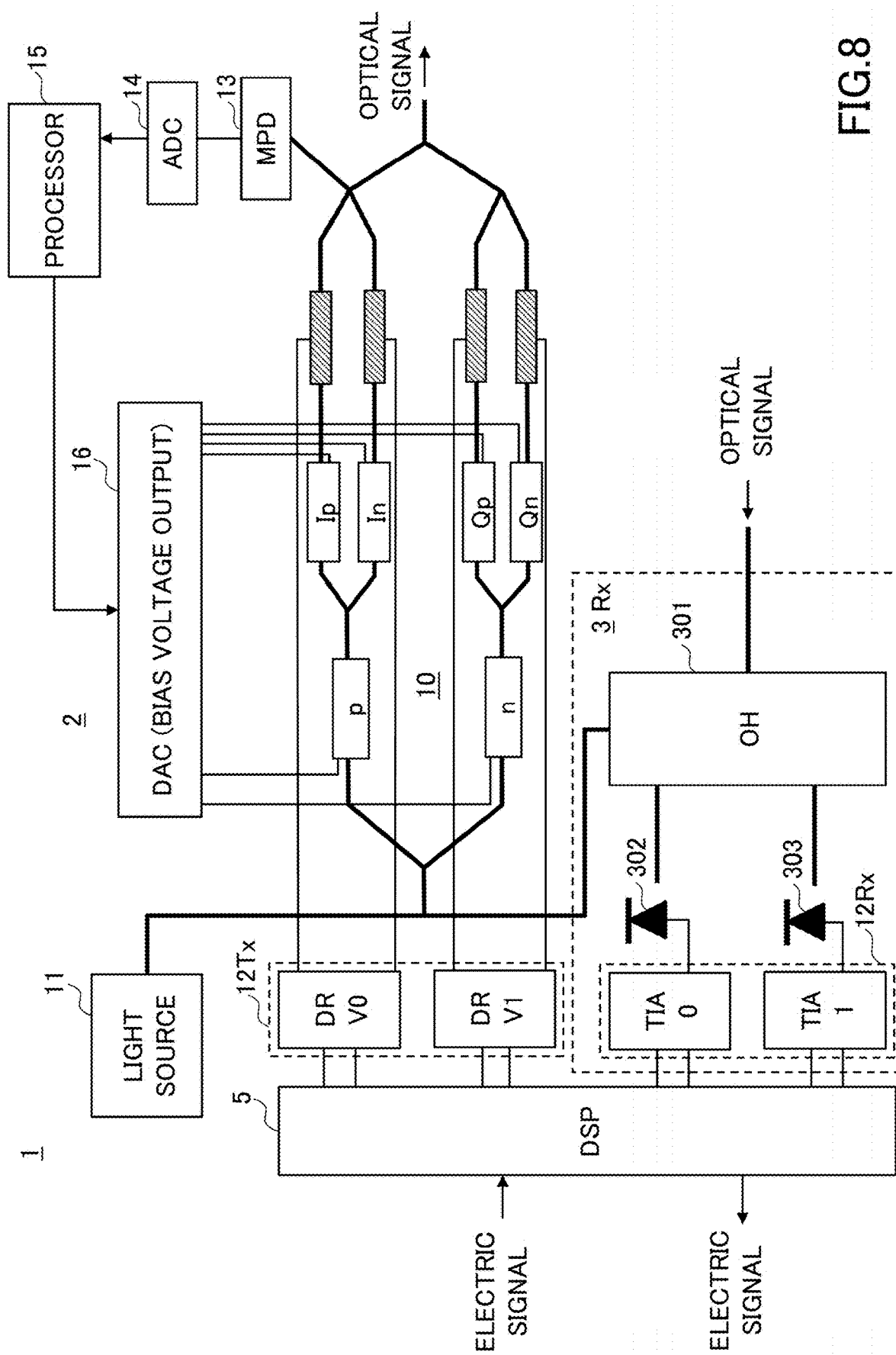
FIG. 8 is a schematic diagram of an optical transceiver according to an embodiment.

FIG. 8 is a schematic diagram of an optical transceiver 1 according to an embodiment. The optical transceiver 1 is a digital coherent transceiver, and includes an optical transmitter 2 and an optical receiver 3. The configuration of the optical transmitter 2 is the same as that of FIG. 2, and redundant description is not repeated.

The DSP 5 is used in common between the optical transmitter 2 and the optical receiver 3. The electric circuit includes an electric circuit 12Tx for the optical transmitter 2 and an electric circuit 12Rx for the optical receiver 3. The electric circuits 12Tx and 12Rx may be integrated on the same chip. A portion of the light beam emitted from the light source 11 is supplied as local oscillator light to the optical hybrid mixer (labelled as "OH" in the figure) 301.

In the optical receiver 3, the optical hybrid mixer 301 causes the received light and the local oscillator light to interfere with each other to separate the received light into the in-phase (I) component and the quadrature-phase (Q) component. The separated I and Q components are detected by the photodiodes 302 and 303, respectively, and converted into photocurrents. The photodiodes 302 and 303 may be balanced photodiodes configured to detect the beat of the signal light and the local oscillator light. The photocurrents are converted into voltage signals by the electric circuit 12Rx and input to the DSP 5.

In the optical transceiver 1, the parent bias of the electro-optic modulator 10 is controlled at double frequency, and the noise can be smoothed, while the biases of the child MZIs and the parent MZI stably converge to the optimum points. The bias control for the electro-optic modulator 10 need not solve simultaneous differential equations. Instead, the dither response components are extracted from the output light of the electro-optic modulator 10, and the amounts of bias control are determined for the respective MZIs by simple calculation. Tolerance to noise and stability of convergence are both achieved with a simple configuration.

Although bias control has been described above based on specific configuration examples in the present disclosure, the bias control technique of the embodiments is not limited to the above-described examples. In the control example of FIG. 4, a long-period DC-like dither that changes by one cycle is superimposed onto the Q bias in the MZC-I/MZP simultaneous control section; however, a DC-like dither that changes by two cycles in this control section may be superimposed onto the Q bias. With this alternative, the average or the median of the four dither responses extracted from the optical output power of the electro-optic modulator may be calculated as the phase error information for MZC-I. The same applies to the MZC-Q/MZP simultaneous control section. Although in the embodiment the electro-optic modulator 10 performing QPSK modulation has been described, the bias control schemes of the embodiments are applicable to other types of modulators, such as dual polarization (DP) QPSK modulators. In this case, the configuration of the electro-optic modulator 10 is provided corresponding to each of the X polarization branch and the Y polarization branch handling orthogonal polarization components. The bias control described above is performed at each of the polarization branches, such that a control information item for I bias, a control information item for Q bias, and two control information items for parent bias are acquired in a single control loop.

What is claimed is:

1. An optical transmitter comprising:
   an electro-optic modulator in which a first child Mach-Zehnder interferometer and a second child Mach-Zehnder interferometer are nested to form a parent Mach-Zehnder interferometer; and
   a processor that controls a first bias voltage for the first child Mach-Zehnder interferometer, a second bias voltage for the second child Mach-Zehnder interferometer, and a third bias voltage for the parent Mach-Zehnder interferometer, based on a monitoring result of output light of the electro-optic modulator,
   wherein the processor simultaneously superimposes different dither signals onto the first bias voltage and the second bias voltage in a first section of a control loop, and extracts first phase error information of the first child Mach-Zehnder interferometer and first-round third phase error information of the parent Mach-Zehnder interferometer, from the monitoring result, and
   in a second section of the control loop, the processor superimposes different dither signals onto the first bias voltage and the second bias voltage, and extracts second phase error information of the second child Mach-Zehnder interferometer and second-round third phase error information of the parent Mach-Zehnder interferometer from the monitoring result.

2. The optical transmitter as claimed in claim 1,
   wherein in the first section, the processor superimposes a first dither signal of a first frequency onto the first bias voltage, and superimposes a second dither signal of a second frequency onto the second bias voltage,
   wherein the processor extracts a first response synchronized with the first dither signal in a first subsection, in which the second dither signal takes on a positive value, from the monitoring result, and in a second subsection in which the second dither signal takes a negative value, the processor extracts a second response synchronized with the first dither signal from the monitoring result, and
   wherein the processor acquires the first phase error information and the first-round third phase error information based on the first response and the second response.

3. The optical transmitter as claimed in claim 2,
   wherein the processor calculates an average of the first response and the second response as the first phase error information to control the first bias voltage based on the first phase error information, and calculates a difference or a ratio between the first response and the second response as the first-round third phase error information to control the third bias voltage based on the first-round third phase error information.

4. The optical transmitter as claimed in claim 3,
   wherein one of the first dither signal and the second dither signal is a DC-like dither signal that changes with a first period, and the other of the first dither signal and the second dither signal is an alternating dither signal that changes with a second period shorter than the first period.

5. The optical transmitter as claimed in claim 3,
   wherein one of the first dither signal and the second dither signal is a DC-like dither signal that changes with a first period, and the other of the first dither signal and the second dither signal is another DC-like dither signal that changes with a second period different from the first period.

6. The optical transmitter as claimed in claim 2,
   Wherein, in the second section, the processor superimposes the first dither signal onto the second bias voltage, and superimposes the second dither signal onto the first bias voltage,
   wherein the processor extracts a third response synchronized with the first dither signal in a third subsection, in which the second dither signal takes a positive value, from the monitoring result, and in a fourth subsection in which the second dither signal takes a negative value, the processor extracts a fourth response synchronized with the first dither signal from the monitoring result, and
   wherein the processor acquires the second phase error information and the second-round third phase error information based on the third response and the fourth response.

7. The optical transmitter as claimed in claim 6,
   wherein the processor calculates an average of the third response and the fourth response as the second phase error information to control the second bias voltage based on the second phase error information, and calculates a difference or a ratio between the third responses and the fourth response as the second-round third phase error information to control the third bias voltage based on the second-round third phase error information.

8. The optical transmitter as claimed in claim 5,
   wherein one of the first dither signal and the second dither signal is a DC-like dither signal that changes with a first period, and the other of the first dither signal and the second dither signal is an alternating dither signal that changes with a second period shorter than the first period.

9. The optical transmitter as claimed in claim 7,
   wherein one of the first dither signal and the second dither signal is a DC-like dither signal that changes with a first period, and the other of the first dither signal and the second dither signal is another DC-like dither signal that changes with a second period different from the first period.

10. The optical transmitter as claimed in claim 6,
    wherein one of the first dither signal and the second dither signal is a DC-like dither signal that changes with a first period, and the other of the first dither signal and the second dither signal is an alternating dither signal that changes with a second period shorter than the first period.

11. The optical transmitter as claimed in claim 6,
    wherein one of the first dither signal and the second dither signal is a DC-like dither signal that changes with a first period, and the other of the first dither signal and the second dither signal is another DC-like dither signal that changes with a second period different from the first period.

12. The optical transmitter as claimed in claim 2, wherein one of the first dither signal and the second dither signal is a DC-like dither signal that changes with a first period, and the other of the first dither signal and the second dither signal is an alternating dither signal that changes with a second period shorter than the first period.

13. The optical transmitter as claimed in claim 2, wherein one of the first dither signal and the second dither signal is a DC-like dither signal that changes with a first period, and the other of the first dither signal and the second dither signal is another DC-like dither signal that changes with a second period different from the first period.

14. An optical transceiver comprising:
an optical transmitter; and
an optical receiver,
wherein the optical transmitter has an electro-optic modulator in which a first child Mach-Zehnder interferometer and a second child Mach-Zehnder interferometer are nested to form a parent Mach-Zehnder interferometer, and a processor that controls a first bias voltage for the first child Mach-Zehnder interferometer, a second bias voltage for the second child Mach-Zehnder interferometer, and a third bias voltage for the parent Mach-Zehnder interferometer, based on a monitoring result of output light of the electro-optic modulator,
wherein the processor simultaneously superimposes different dither signals onto the first bias voltage and the second bias voltage in a first section of a control loop, and extracts first phase error information of the first child Mach-Zehnder interferometer and first-round third phase error information of the parent Mach-Zehnder interferometer, from the monitoring result, and
in a second section of the control loop, the processor superimposes different dither signals onto the first bias voltage and the second bias voltage, and extracts second phase error information of the second child Mach-Zehnder interferometer and second-round third phase error information of the parent Mach-Zehnder interferometer from the monitoring result.

15. A method of controlling a bias voltage of an electro-optic modulator in which a first child Mach-Zehnder interferometer and a second child Mach-Zehnder interferometer are nested to form a parent Mach-Zehnder interferometer, the method comprising:
in a first section of a control loop, simultaneously superimposing different dither signals on a first bias voltage of the first child Mach-Zehnder interferometer and a second bias voltage of the second child Mach-Zehnder interferometer;
monitoring a portion of output light of the electro-optic modulator to acquire a first monitoring result;
acquiring first phase error information for the first child Mach-Zehnder interferometer and first-round third phase error information for the parent Mach-Zehnder interferometer from the first monitoring result;
in a second section of the control loop, simultaneously superimposing different dither signals on the first bias voltage of the first child Mach-Zehnder interferometer and the second bias voltage of the second child Mach-Zehnder interferometer;
monitoring a portion of output light of the electro-optic modulator to acquire a second monitoring result; and
acquiring second phase error information for the second child Mach-Zehnder interferometer and second-round third phase error information for the parent Mach-Zehnder interferometer from the second monitoring result.

16. The method as claimed in claim 15, comprising:
after acquiring the first phase error information and the first-round third phase error information, controlling the first bias voltage and the third bias voltage so that the first phase error information and the first-round third phase error information approach zero; and
after acquiring the second phase error information and the second-round third phase error information, controlling the second bias voltage and the second bias voltage so that the second phase error information and the second-round third phase error information approach zero.

* * * * *